United States Patent
Pratt et al.

(10) Patent No.: US 10,346,626 B1
(45) Date of Patent: Jul. 9, 2019

(54) VERSIONED ACCESS CONTROLS

(71) Applicant: Amazon Technologies, Inc., Reno, NV (US)

(72) Inventors: Brian Irl Pratt, Seattle, WA (US);
Kathryn Marie Shih, Seattle, WA (US); Patrick James Ward, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 307 days.

(21) Appl. No.: 13/854,679

(22) Filed: Apr. 1, 2013

(51) Int. Cl.
*G06F 17/30* (2006.01)
*G06F 21/62* (2013.01)

(52) U.S. Cl.
CPC .............................. *G06F 21/6218* (2013.01)

(58) Field of Classification Search
CPC ......... G06F 2221/2141; G06F 17/3023; G06F 17/30309
USPC ................................ 707/695, 781, 608, 638
See application file for complete search history.

(56) References Cited

U.S. PATENT DOCUMENTS

| | | | | |
|---|---|---|---|---|
| 7,421,458 B1 * | 9/2008 | Taylor | ................... | G06F 16/289 707/707 |
| 7,603,330 B2 * | 10/2009 | Gupta | ................... | G06N 20/00 706/20 |
| 7,925,666 B1 * | 4/2011 | Johnson | ................ | G06F 21/604 707/781 |
| 8,214,398 B1 | 7/2012 | Cowan et al. | | |
| 8,255,429 B2 * | 8/2012 | Lange | ..................... | G06F 8/656 707/803 |
| 8,261,345 B2 * | 9/2012 | Hitomi | .................... | G06F 9/468 726/22 |
| 8,266,702 B2 | 9/2012 | Naldurg et al. | | |
| 8,321,437 B2 | 11/2012 | Lim | | |
| 8,359,467 B2 * | 1/2013 | Subramanian | ...... | G06F 21/6218 713/165 |
| 8,769,417 B1 * | 7/2014 | Robinson | ............ | G06F 16/9535 715/751 |
| 2002/0040312 A1 * | 4/2002 | Dhar | ......................... | A61J 9/00 705/7.26 |
| 2004/0009751 A1 * | 1/2004 | Michaelis | ............. | H04W 88/06 455/62 |

(Continued)

OTHER PUBLICATIONS eXtensible Access Control Markup Language (XACML) Version 3.0, OASIS Open, Jan. 22 2013. Source: http://docs.oasis-open.org/xacml/3.0/xacml-3.0-core-spec-os-en.pdf pp. 1-154.

(Continued)

*Primary Examiner* — Alexandria Y Bromell
(74) *Attorney, Agent, or Firm* — Robert C. Kowert; Meyertons, Hood, Kivlin, Kowert & Goetzel, P.C.

(57) ABSTRACT

Methods and systems for implementing versioned access controls are disclosed. A first task is added to a first workflow with a first version of a default role. A second version of the default role is generated after the first task is added. A second task is added to a second workflow with the second version of the default role. The first version and the second version each comprise one or more permissions for using one or more computing resources. The first task is performed using the permissions in the first version of the default role. The second task is performed using the permissions in the second version of the default role.

22 Claims, 10 Drawing Sheets

(56) References Cited

U.S. PATENT DOCUMENTS

| | | | |
|---|---|---|---|
| 2006/0085412 A1* | 4/2006 | Johnson | G06F 16/256 |
| 2007/0219843 A1 | 9/2007 | Keeler et al. | |
| 2007/0239715 A1* | 10/2007 | DeBie | G06F 16/93 |
| | | | 707/707 |
| 2007/0288576 A1* | 12/2007 | Illg | G06Q 10/107 |
| | | | 709/206 |
| 2008/0046433 A1* | 2/2008 | Kool-Brown | G06F 16/9535 |
| | | | 707/707 |
| 2008/0109735 A1* | 5/2008 | Vuong | H04L 51/00 |
| | | | 715/752 |
| 2008/0201191 A1 | 8/2008 | Carter | |
| 2009/0119371 A1* | 5/2009 | Chang | H04L 12/1827 |
| | | | 709/206 |
| 2009/0198548 A1 | 8/2009 | Kohler et al. | |
| 2009/0228716 A1* | 9/2009 | Poston | G06F 21/6209 |
| | | | 713/189 |
| 2009/0313240 A1* | 12/2009 | Gile | G06F 17/278 |
| 2009/0320088 A1 | 12/2009 | Gill et al. | |
| 2010/0063797 A1* | 3/2010 | Cong | G06F 16/367 |
| | | | 704/9 |
| 2010/0125579 A1* | 5/2010 | Pardoe | G06F 16/86 |
| | | | 707/736 |
| 2011/0107294 A1* | 5/2011 | Ionfrida | G06Q 30/02 |
| | | | 717/101 |
| 2011/0123967 A1* | 5/2011 | Perronnin | G09B 7/02 |
| | | | 434/178 |
| 2011/0283281 A1 | 11/2011 | Svetov et al. | |
| 2012/0078902 A1* | 3/2012 | Duboue | G06F 16/334 |
| | | | 707/736 |
| 2012/0304307 A1 | 11/2012 | Ramesh et al. | |
| 2013/0008037 A1* | 1/2013 | Ebner | B43L 7/02 |
| | | | 33/42 |
| 2013/0124254 A1 | 5/2013 | Jafri et al. | |
| 2013/0295546 A1* | 11/2013 | Bierner | G09B 7/02 |
| | | | 434/350 |
| 2014/0082689 A1 | 3/2014 | Christiaens et al. | |
| 2014/0189085 A1 | 7/2014 | Khandelwal et al. | |

OTHER PUBLICATIONS

U.S. Appl. No. 13/854,669, filed Apr. 1, 2013, Brian Irl Pratt.

* cited by examiner

VERSIONED ACCESS CONTROLS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

As the technological capacity for organizations to create, track, and retain information continues to grow, a variety of different technologies for managing and storing the rising tide of information have been developed. Distributed storage systems, for example, provide clients with many different configurations of hardware and software to manage stored information. However, the increasing amounts of data that organizations must store and manage often correspondingly increase both the size and complexity of data storage and management technologies, which in turn escalate the cost of maintaining the information. New technologies seek to reduce both the complexity and storage requirements of maintaining data while simultaneously improving the efficiency of data storage and data management.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for versioned access controls and custom access controls are described. Using the systems and methods described herein, different versions of roles may be used throughout a system such as a configurable workflow service. Each role (or version of a role) may authorize one or more actions in the system, such as the use of one or more computing resources, to be taken on behalf of the client. When a node and/or a workflow is provisioned, the node and/or the workflow may be associated with the current version of a default role. After a new version of the default role is generated, the roles associated with previously generated nodes may be left unchanged. In some embodiments, a custom role may be generated for a newly provisioned node and/or workflow based on permissions needed for the actions that the node and/or workflow is expected to perform. The custom role may also be left unchanged by changes to other roles. In this manner, client expectations regarding the behavior of existing workflows and their roles may not be contravened.

Figure 1A:
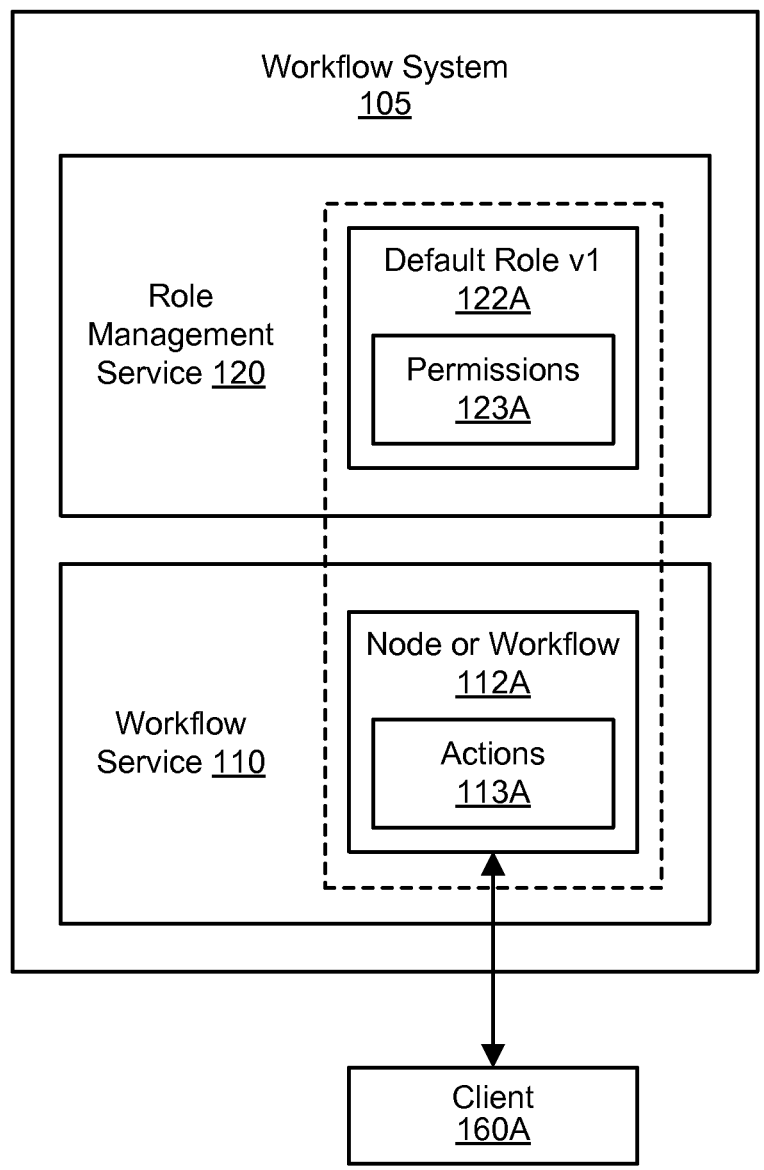
FIGS. 1A, 1B, and 1C illustrate an example system environment for versioned access controls, according to one embodiment.
Figure 1B:
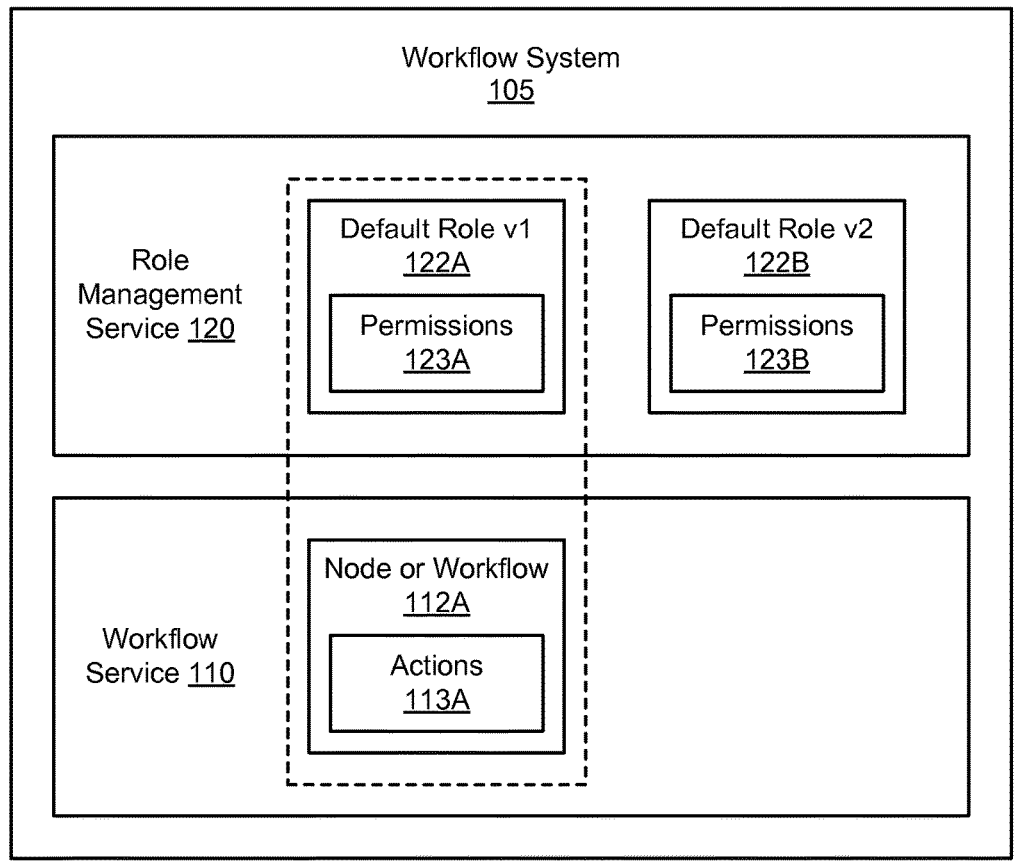
Figure 1C:
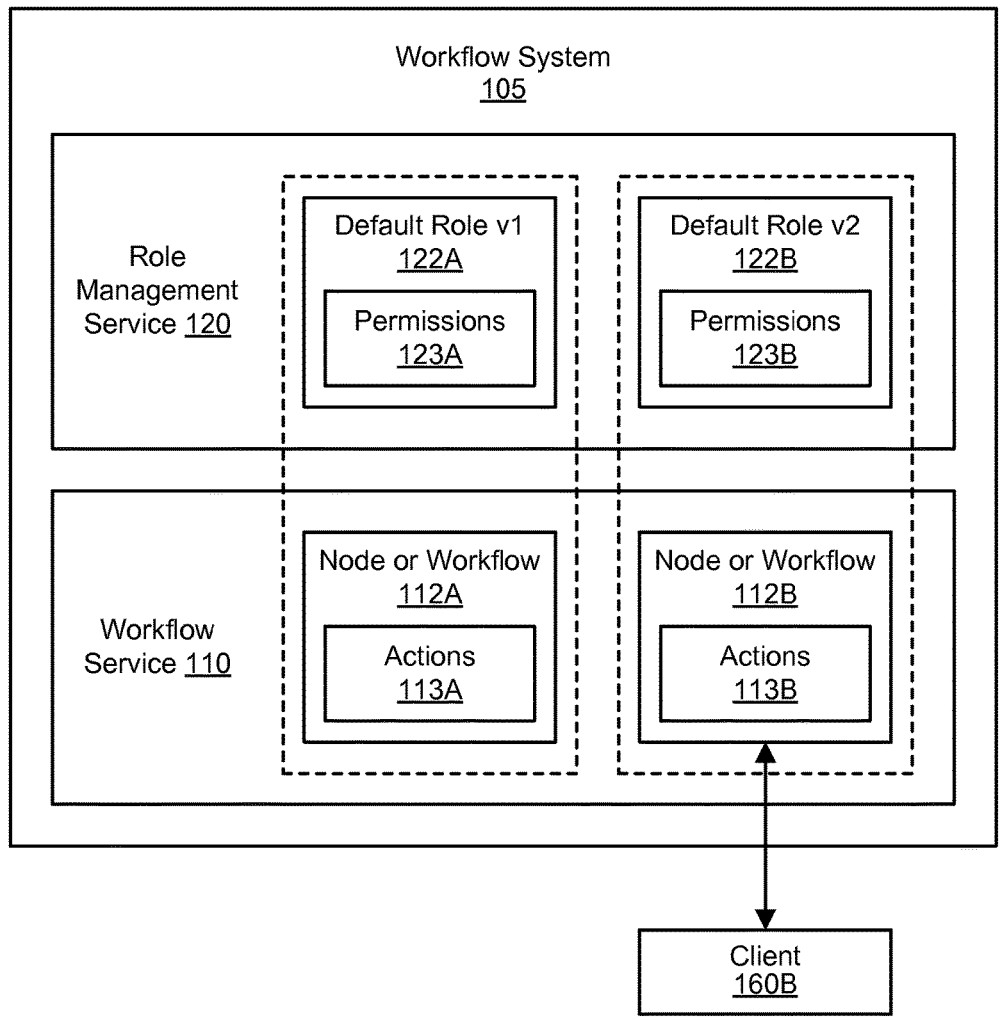

FIGS. 1A through 1C illustrate an example system environment for versioned access controls, according to one embodiment. Each of FIGS. 1A, 1B, and 1C may illustrate the same example system environment at a different point in time. The example system environment may include a workflow system 105. The workflow system 105 may include a plurality of components for managing the creation and execution of defined workflows for various clients. For example, the workflow system may include a workflow service 110 and a role management service 120. As part of implementing a defined workflow, the workflow service 110 may provision particular computing nodes to each perform specified activities corresponding to a defined workflow. The role management service 120 may manage the assignment of particular roles to workflows and/or to particular nodes in one or more workflows. In various embodiments, the role management service 120 may be a component of the workflow service 110 or, as shown in FIG. 1A, it may be external to the workflow service 110. Additional aspects of a workflow system and workflow service are discussed with respect to FIG. 6.

Figure 7:
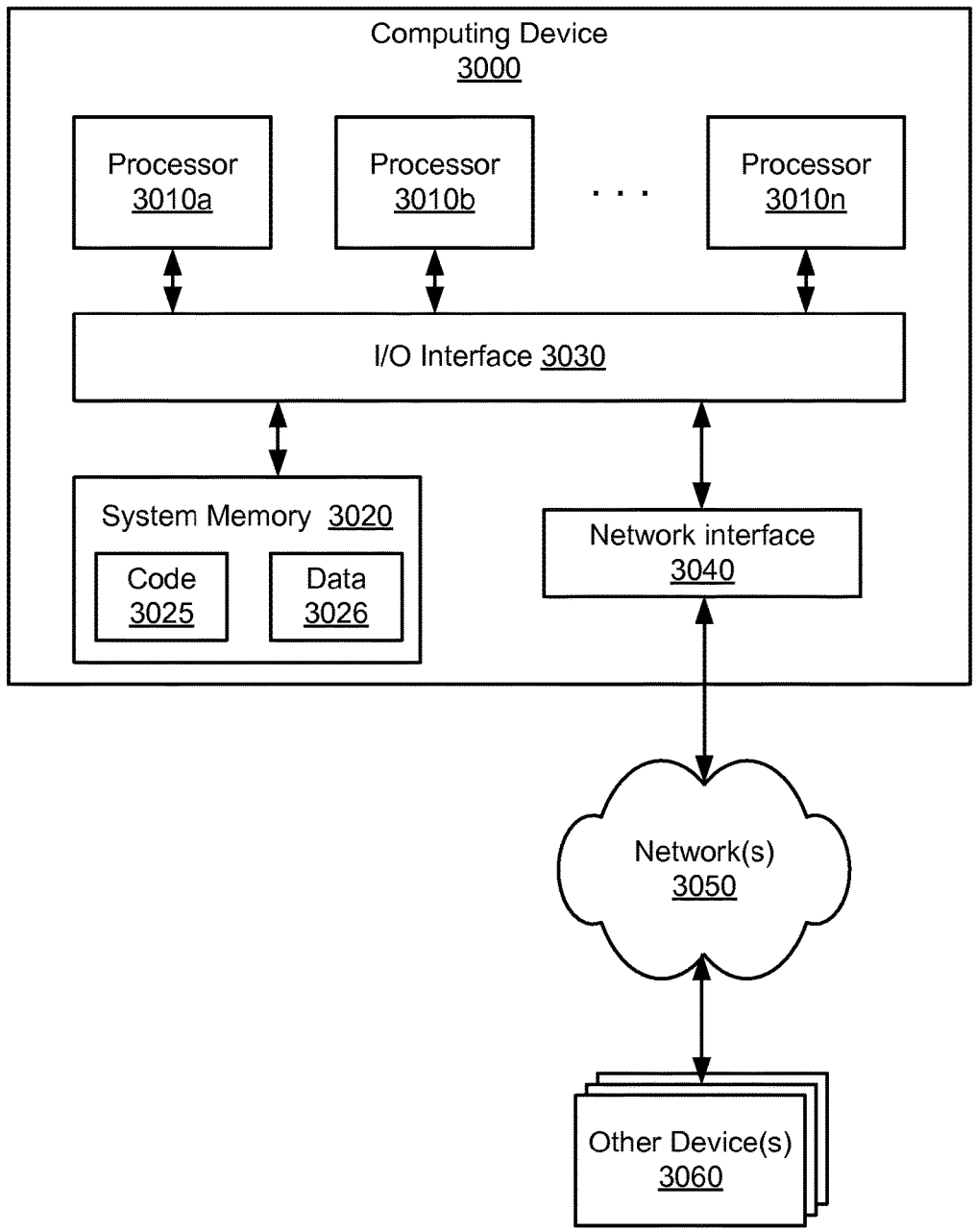
FIG. 7 illustrates an example of a computing device that may be used in some embodiments.

The workflow system 105 may comprise one or more computing devices, any of which may be implemented by the example computing device 3000 illustrated in FIG. 7. In various embodiments, the functionality of the different services, components, and/or modules (e.g., workflow service 110 and role management service 120) may be provided by the same computing device or by different computing devices. If the workflow service 110 and role management service 120 are implemented using different computing devices, then the respective computing devices may be communicatively coupled, e.g., via a network. Each of the workflow service 110 and role management service 120 may represent any combination of software and hardware usable to perform their respective functions, as discussed as follows.

Access controls in the workflow system 105 may be implemented using roles. In one embodiment, a particular role dictates what actions may be taken on behalf of a user (e.g., a client). In other words, a role enumerates a set of permissions for using resources within the workflow system 105. A workflow may include one or more nodes, and each node may be configured to perform one or more tasks. In one embodiment, an entire workflow may be associated with a particular role, such that all of the nodes in the workflow may share the same role. In one embodiment, each node of a workflow may be configured with or associated with its own individual role. The role may permit a node of the workflow to perform the tasks. A role is assumed by a node in a workflow and/or a user of the node. Workflows are discussed in greater detail below, e.g., with respect to FIG. 6. To simplify the provisioning of nodes, default roles may be assigned to new users and/or new nodes. In one embodiment, the role (e.g., default role) assigned to a user or node may be modified, i.e., by adding or removing authorized actions.

As additional services or computing resources (e.g., storage resources) are made available to nodes, the list of actions that a node may potentially perform will likewise grow. However, modifying the roles associated with existing nodes may violate the expectations of users of those nodes, especially when the roles have been customized in ways that are difficult to predict. Accordingly, default roles may be versioned. For example, a first default role may be termed "Default Role v1" and may enumerate a list of permitted actions to be taken on behalf of a user. After additional services and/or computing resources become available, a second default role termed "Default Role v2" may enumerate a different list of permitted actions. A node may be assigned the current default role at the time when the node is provisioned, added to a workflow, or otherwise created. When a new version of the default role is created, the new version may be promulgated to newly provisioned nodes but not to existing nodes. In one embodiment, any version of the default role may include a broad set of permissions for accessing commonly used resources.

As will be discussed further with respect to FIG. 6, a workflow (also referred to herein as a "pipeline") may include one or more nodes (also referred to herein as "objects"). As illustrated in FIG. 1A, a client 160A may seek to add a particular node or workflow 112A to the workflow system 105. The node or workflow 112A may be represented by a description that describes, for example, the tasks (i.e., actions) to be taken by the node or workflow, the parameters of the tasks, etc. The node or workflow 112A may indicate one or more actions 113A to be performed by the workflow system 105 on behalf of the client 160A. Using the systems and methods described herein, the role management service 120 may automatically assign the most current version of a default role to the new node or workflow 112A. In one embodiment, the role management service 120 may automatically assign the most current version of the default role to an entire workflow at the time the workflow is created, and any nodes included in the workflow may inherit the version of the role associated with the workflow. For example, a default role termed the "Default Role v1" 122A may be the most up-to-date version of the default role and may therefore be associated with the node or workflow 112A. Any suitable technique may be used to associate the default role 122A with the node or workflow 112A, such as storing appropriate data or metadata within the description of the node or workflow 112A or storing appropriate data or metadata within a metadata service that is external to the node or workflow 112A. In one embodiment, the default role 122A may be assigned to the node or workflow 112A and/or assumed by the node or workflow 112A without direct user input to create the assignment. The default role 122A may enumerate a list of one or more permissions 123A to perform various actions within the workflow system 105, e.g., using one or more computing resources of the workflow system 105.

Using the permissions 123A, the actions 113A may be performed by the workflow service 110 on behalf of a user and/or by the one or more computing resources on behalf of the user. The actions performed by the workflow service may include, for example, spawning more computing instances. The actions performed by the computing resources may include, for example, accessing storage resources. In the latter case, the permissions or other authorization credentials may be passed to the relevant computing resource(s) by the workflow service 110. In various embodiments, permissions for the default role may include permission(s) to launch, monitor, and terminate compute instances; permission(s) to launch, monitor, and terminate clusters; permission(s) to read from and write to storage resources and database resources; and permission(s) to inspect resources such as relational database service instances, e.g., to identify a connection port. The permissions in a default role may be limited to accessing only the particular resources that the client has been authorized to access. In one embodiment, a wildcard indicator (e.g., "*") in the default role may act to limit client access in this manner.

FIG. 1B illustrates the same workflow system 105 at a later point in time than FIG. 1A. As illustrated in FIG. 1B, a new version of the default role termed "Default Role v2" 122B has been added to the role management service 120. The default role 122B may enumerate a list of one or more permissions 123B to perform various actions within the workflow system 105. The permissions 123B may vary from the permissions 123A due to the addition of various services or resources to the workflow system 105 and/or due to the deletion of services or resources from the workflow system 105. However, after the second version of the default role 122B has been created, the association between the first version of the default role 122A and the node or workflow 112A is maintained. Accordingly, when the actions 113A defined by the node or workflow 112A are performed, the older permissions 123A will be used rather than the newer permissions 123B.

FIG. 1C illustrates the same workflow system 105 at yet a later point in time than FIG. 1B. As illustrated in FIG. 1C, a client 160B may seek to add a new node or workflow 112B to the workflow system 105. The node or workflow 112B may be represented by a description that describes, for example, the tasks (i.e., actions) to be taken by the node or workflow, the parameters of the tasks, etc. In various embodiments, the client 160B may be the same client or a different client as the client 160A shown in FIG. 1A. The node or workflow 112B may indicate one or more actions 113B to be performed by the workflow system 105 on behalf of the client 160B. Using the systems and methods described herein, the role management service 120 may automatically assign the most current version of the default role to the new node or workflow 112B. In this case, the current version of the default role is the "Default Role v2" 122B. Accordingly, the "Default Role v2" 122B may therefore be associated with the node or workflow 112B. Any suitable technique may be used to associate the default role 122B with the node or workflow 112B, such as storing appropriate data or metadata within the description of the node or workflow 112B or storing appropriate data or metadata within a metadata service that is external to the node or workflow 112B. In one embodiment, the default role 122B may be assigned to the node or workflow 112B and/or assumed by the node or workflow 112B without direct user input to create the assignment. In this manner, two nodes or workflows 112A and 112B provisioned at two different points in time may assume two different versions (122A and 122B, respectively) of a default role authorizing various actions to be performed.

In one embodiment, the user may be alerted by the workflow system 105 to the addition of a new version of the default role. For example, the client 160A that previously provisioned the node or workflow 112A with the first version of the default role 122A may be alerted to the addition of the second version 122B. In one embodiment, the client 160A may be alerted only if the changes in the new version of the default role would affect the behavior of the node or workflow 112A. The alert may be generated using any suitable technique, such as a message sent to the client and displayed in a user interface associated with the workflow service 110. In response to the alert, the user may decide to modify the node or workflow 112A with the second version of the default role 122B or maintain the association between the node or workflow 112A and the first version of the default role 122A. The workflow service 110 may receive user input indicating the choice and act accordingly.

In one embodiment, permissions (e.g., permissions 123A and 123B) may be defined in accordance with an Access Policy Language. The Access Policy Language may express each permission as a statement. A document known as a policy may act as a container for one or more statements. Each user who is granted permission in a policy may be termed a principal. The activity that the principal is granted permission to perform is referred to as an action. The object to which the principal requests access may be termed a resource. Additionally, a permission may be restricted by one or more conditions. Conditions typically relate to date and time restrictions (e.g., the request must arrive before a specific date and time) or to IP address restrictions (e.g., the requester's IP address must be part of a specific range). The specific characteristic that is the basis for the access restriction may be referred to as a key. An evaluation process may determine whether an incoming request should be denied or allowed based on the applicable policies. The permissions in a role may be modified by a user by rewriting the Access Policy Language expressions in the role, either directly or through a suitable interface (e.g., a graphical interface) that generates Access Policy Language expressions based on user input.

In one embodiment, the management of roles may also include the management of one or more access keys corresponding to each permitted action. When a node is activated, access keys or other security credentials corresponding to the specified permissions may be securely provisioned to the node. The access keys may be used to gain access to computing resources in order to perform actions associated with the node. In one embodiment, the access keys or other security credentials may be temporary, and the temporary keys or credentials may be rotated periodically (e.g., several times per day) for enhanced security.

Figure 2:
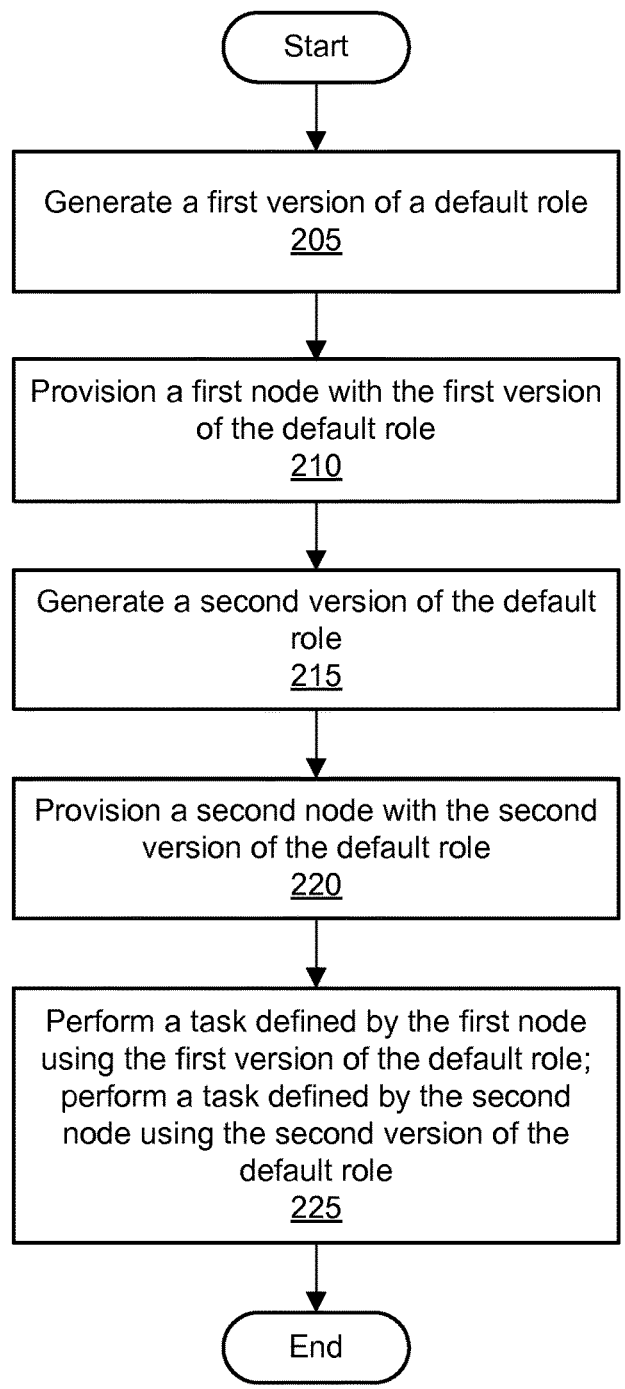
FIG. 2 is a flowchart illustrating a method for implementing versioned access controls, according to one embodiment.

FIG. 2 is a flowchart illustrating a method for implementing versioned access controls, according to one embodiment. As shown in 205, a first version of a default role may be generated. The first version of the default role includes data indicative of one or more permissible actions for using the one or more computing resources. As shown in 210, a first node in a workflow may be provisioned. When the first node is provisioned, it may be associated with the current version of the default role, i.e., the first version of the default role.

As shown in 215, a second version of the default role may be generated. The second version of the default role also includes data indicative of one or more permissible actions for using the one or more computing resources, but the permissible actions in the second version may differ from the permissible actions in the first version. As shown in 220, a second node in a workflow may be provisioned. The workflow may be the same workflow as referenced in 210 or a different workflow, and the requesting client may be the same client or a different client. When the second node is provisioned, it may be associated with the current version of the default role, i.e., the second version of the default role.

As shown in 225, a task (i.e., a first task) defined by the first node may be performed, and a task (i.e., a second task) defined by the second node may also be performed. The first task and the second task may be performed in any order. In performing the first task, the one or more computing resources may be used in accordance with the first version of the default role. In performing the second task, the one or more computing resources may be used in accordance with the second version of the default role.

In one embodiment, roles may be modified by clients. For example, after a default role is assigned to a newly provisioned node, a client may modify the default role, e.g., by adding or deleting permissions. The modified role, rather than the default role, may then be associated with the node. Any suitable interface may be used to receive user input to create the modified role. For example, permissions may be added to the role or deleted from the role using suitable elements of a graphical user interface (GUI), a command-line interface (CLI), or an application programming interface (API). In one embodiment, modified roles may be stored (e.g., by the role management service 120) for later re-use by the same client and/or a different client. A sanity check may be performed to verify the suitability of the modified role. If the sanity check fails, any of various actions may be taken: e.g., warning the user, disabling the node, reverting to the previous role, etc.

Figure 3:
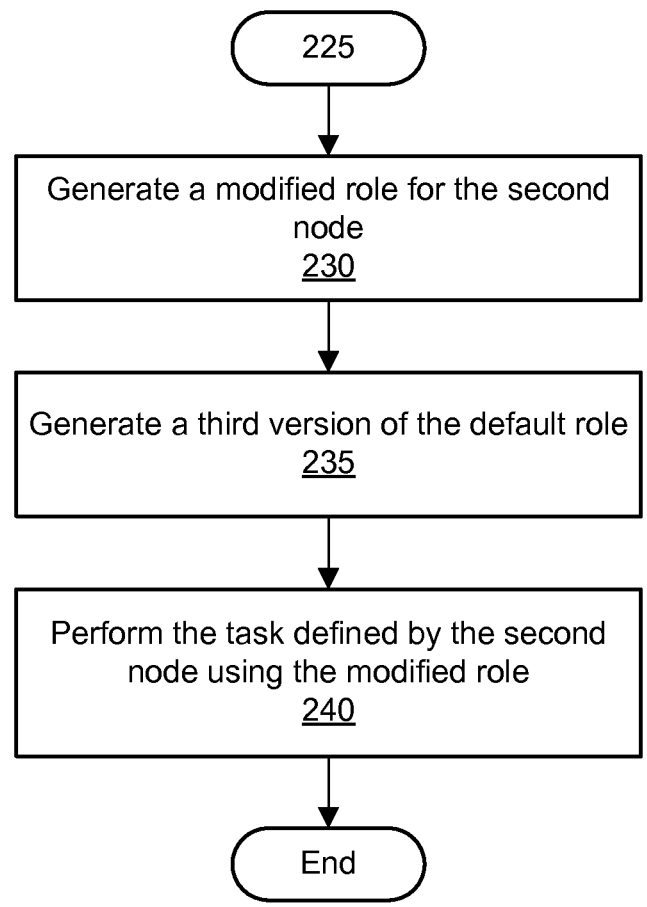
FIG. 3 is a flowchart illustrating further aspects of a method for implementing versioned access controls, according to one embodiment.

FIG. 3 is a flowchart illustrating further aspects of a method for implementing versioned access controls, according to one embodiment. In one embodiment, the operations shown in FIG. 3 may be performed after the operations indicated in 205-225 are performed. As shown in 230, a modified role may be generated for the second node. The modified role may be generated based on user input, and the modified role may be based on the second version of the default role. In other words, the user input used to generate the modified role may comprise one or more additions of permissions to the second version of the default role and/or one or more deletions of permissions found in the second version of the default role.

As shown in 235, a third version of the default role may be generated. The third version of the default role also includes data indicative of one or more permissible actions for using the one or more computing resources, but the permissible actions in the third version may differ from the permissible actions in the second version. As shown in 240, a task (i.e., the second task) defined by the second node may be performed again. In performing the second task, the one or more computing resources may be used in accordance with the modified role rather than any version of the default role. In other words, the modifications to the second version of the default role to generate the modified role are not undone by the generation of the third version of the default role.

Figure 4A:
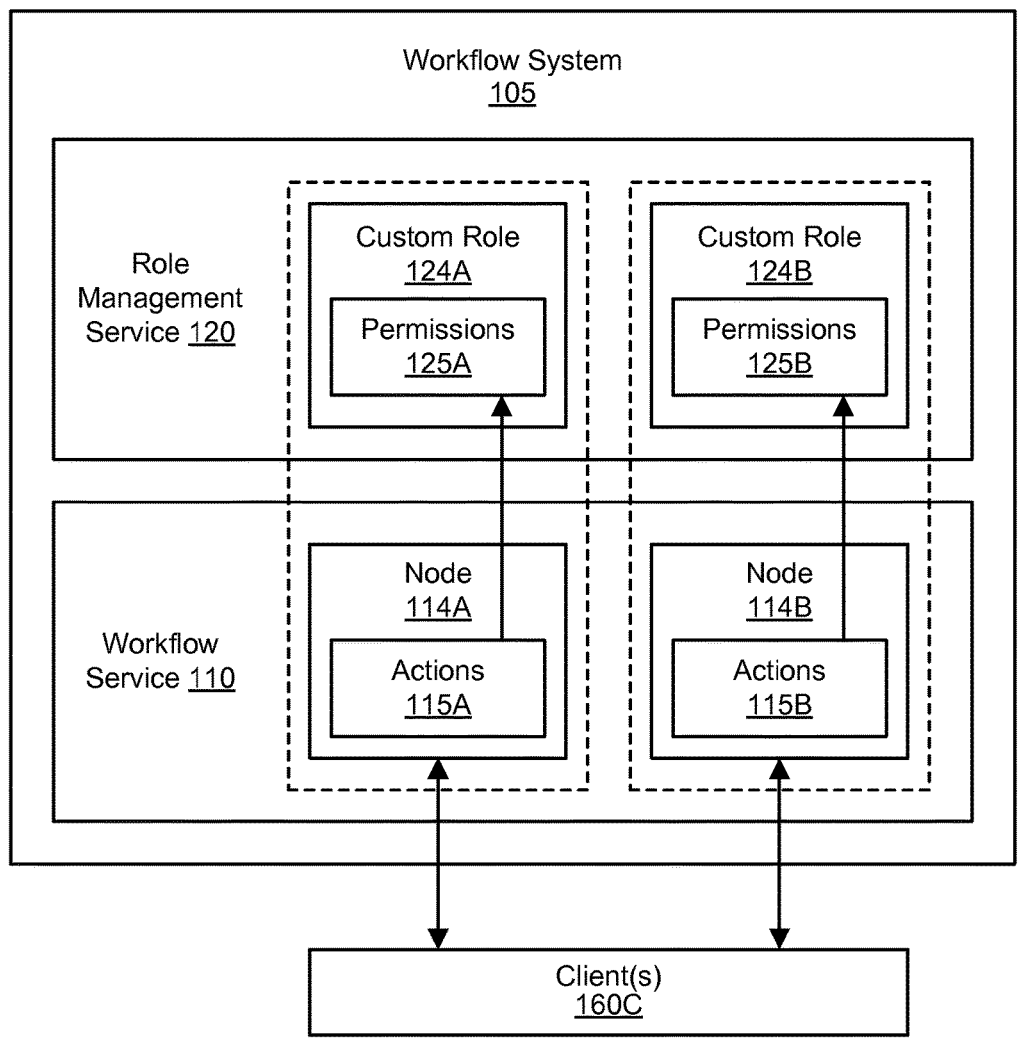
FIGS. 4A and 4B illustrate an example system environment for custom access controls, according to one embodiment.

In some embodiments, custom roles may be generated for nodes. FIG. 4A illustrates an example system environment for custom access controls, according to one embodiment. As discussed previously with respect to FIG. 1A, the example system environment may include a workflow system 105. The workflow system 105 may include a workflow service 110 and a role management service 120. As part of implementing a defined workflow, the workflow service 110 may provision particular computing nodes to each perform specified activities corresponding to a defined workflow. The role management service 120 may manage the assignment of particular roles to workflows and/or to particular nodes in one or more workflows. In various embodiments, the role management service 120 may be a component of the workflow service 110 or, as shown in FIG. 4A, it may be external to the workflow service 110.

One or more clients 160C may seek to add multiple nodes, such as nodes 114A and 114B, to one or more workflows managed by the workflow service 110. Each of the nodes 114A and 114B may be represented by a corresponding node description that describes, for example, the tasks (i.e., actions) to be taken by the node, the parameters of the tasks, etc. The node 114A may indicate one or more actions 115A to be performed by the workflow system 105 on behalf of the client(s) 160C. Likewise, the node 114B may indicate one or more actions 115B to be performed by the workflow system 105 on behalf of the client(s) 160C.

Using the systems and methods described herein, the role management service 120 may automatically generate a custom role for a node that is added to a workflow or otherwise provisioned. In one embodiment, an entire workflow may be associated with a particular custom role, such that all of the nodes or tasks in the workflow may share the same custom role. In one embodiment, each node or task of a workflow may be configured with or associated with its own individual custom role. For example, as illustrated in FIG. 4A, a custom role 124A may be created for and associated with a first node 114A, and a different custom role 124B may be created for and associated with a second node 114B. The first node 114A and the second node 114B may be part of the same workflow or different workflows. Similarly, different tasks within a node or workflow may share the same custom role or may be associated with different custom roles. Any suitable technique may be used to associate a custom role with the corresponding node or task, such as storing appropriate data or metadata within the description of the node or storing appropriate data or metadata within a metadata service that is external to the node. In one embodiment, the custom role may be assigned to the corresponding node and/or assumed by the node without direct user input to create the assignment.

The principle of least privilege may be followed in order to restrict the access privileges of individual nodes. Each custom role may be generated such that it enumerates only those permissions that are required to perform the one or more actions to be taken by the corresponding node. For example, if a node is configured to store data using a particular storage resource, the one or more permissions that are required to perform the action may include write access to the storage resource. Similarly, if a node is configured to retrieve data from a particular storage resource, the one or more permissions that are required to perform the action may include read access to the storage resource. A custom role may therefore apply to the specific action(s) to be performed by a node as well as the specific object(s) of those action(s). In general, if a node is configured to use a particular service or resource, the permissions that are required to perform the action may include any necessary authorization credentials to access the service or resource in the manner defined by the node. The set of permissions in a custom role may be selected and/or generated based on the access requirements of one or more tasks or nodes in a workflow. The necessary permissions may be determined by any suitable technique(s), including inspection or analysis of the program code associated with the task, instrumentation of the program code, inspection of metadata supplied by the client, etc.

Accordingly, the custom role 124A for the first node 114A may include permissions 125A corresponding to the actions 115A. Similarly, the custom role 124B for the second node 114B may include permissions 125B corresponding to the actions 115B. The permissions 125A may differ from the permissions 125B based on the differences between the actions 115A and the actions 115B. Each custom role 124A or 124B may enumerate a list of one or more permissions 125A or 125B to perform various actions within the workflow system 105, e.g., using one or more computing resources of the workflow system 105. Using the permissions 125A or 125B, the actions 115A or 115B may be performed by the workflow service 110 on behalf of a user and/or by the one or more computing resources on behalf of the user. If each workflow has only one custom role, then the custom role may be broad enough to authorize the tasks performed by all of the nodes in the workflow. However, if each node has its own custom role, then the custom roles may differ from node to node. In one embodiment, multiple custom roles may be created for the same node, e.g., for each task in the node, in order to access different resources with different security requirements or characteristics. In one embodiment, the permissions for the custom roles (e.g., permissions 125A and 125B) may be defined in accordance with the Access Policy Language discussed previously.

Figure 4B:
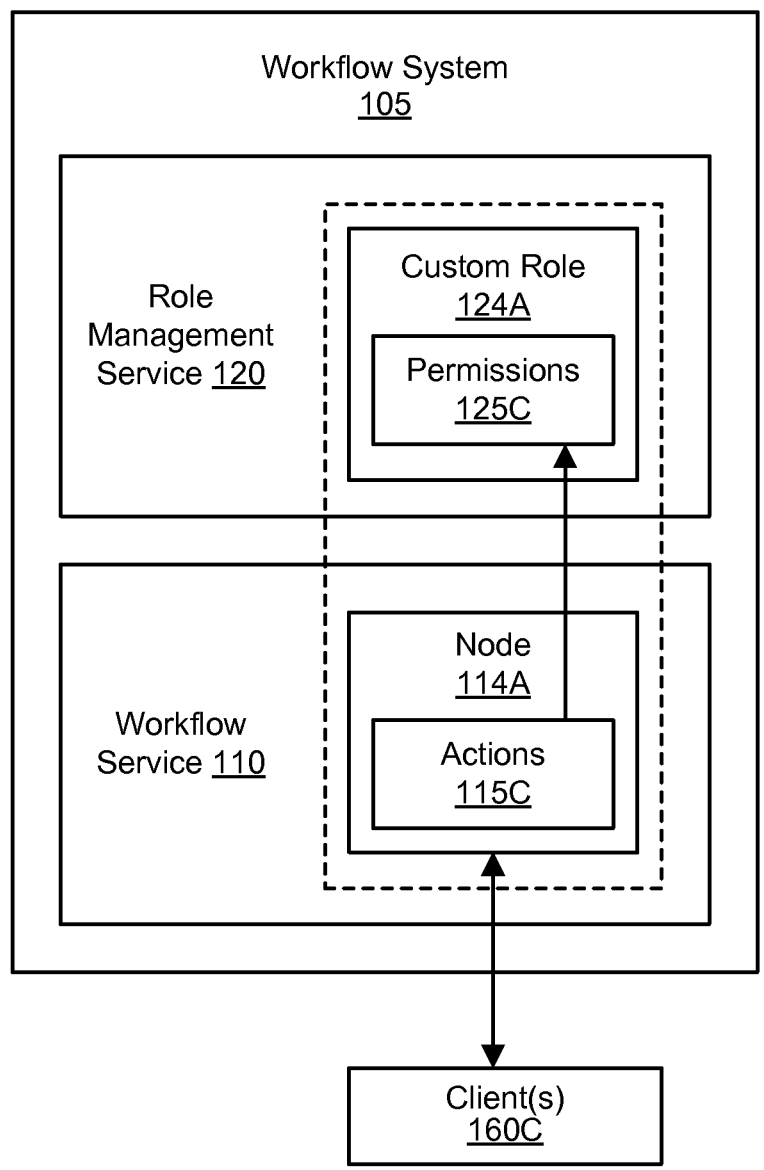

FIG. 4B illustrates further aspects of the example system environment for custom access controls, according to one embodiment. If the actions associated with a node are modified, then the custom role for the node may also be automatically modified based on the modified actions. For example, as shown in FIG. 4B, the original actions 115A associated with node 114A may be replaced by the modified actions 115C. Relative to the original actions 115A, the modified actions 115C may include additions of individual actions and/or deletions of individual actions. As a result of this modification, the original permissions 125A in the custom role 124A may be replaced by the modified permissions 125C. As discussed above, the modified permissions 125C may be generated such that they include only those permissions that are required to perform the modified actions 115C to be taken by the corresponding node.

Figure 5:
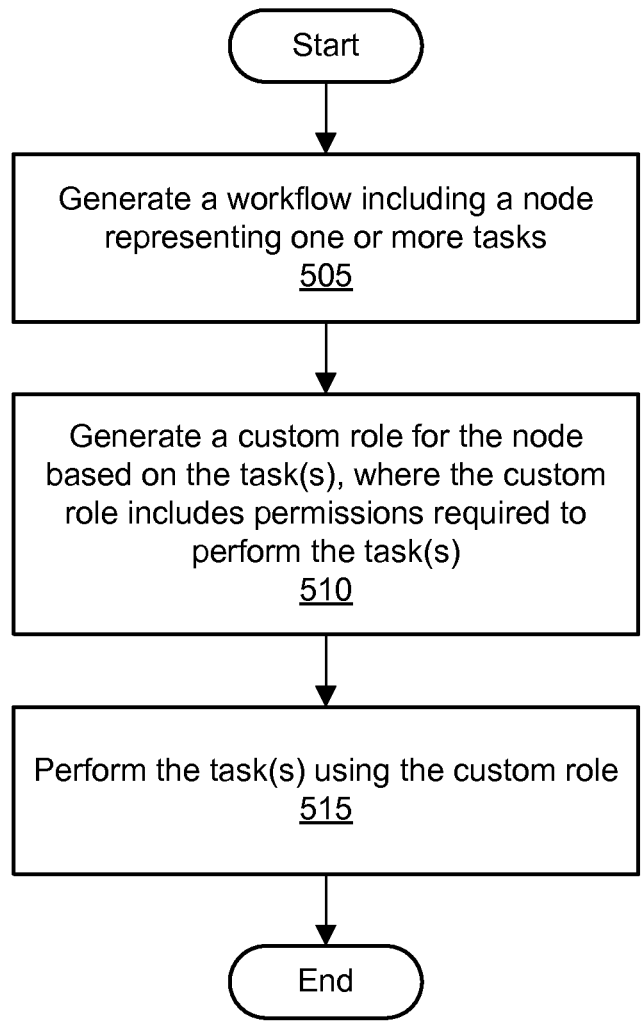
FIG. 5 is a flowchart illustrating a method for implementing custom access controls, according to one embodiment.

FIG. 5 is a flowchart illustrating a method for implementing custom access controls, according to one embodiment. As shown in 505, a workflow comprising a node may be generated. The node may represents at least one task that uses or accesses one or more computing resources. In one embodiment, the node may be represented by a node description that identifies the task along with any associated inputs, outputs, or other parameters.

As shown in 510, a custom role may be generated for the node. In one embodiment, the custom role may be generated for the node based on analysis or examination of the actions associated with the node, e.g., the task. The custom role may include one or more permissions for using or accessing the one or more computing resources, where the one or more permissions in the custom role are required to perform the task. If the node also includes any additional task(s), either at the time of its provisioning or upon modification at a later time, then the one or more permissions in the custom role may be expanded to include the permissions required to perform the additional task(s) as well as the permissions required to perform the original task.

As shown in 515, the task(s) may be performed using the custom role. In performing the task(s), the one or more computing resources may be used or accessed in accordance with the one or more permissions generated for the custom role. Similarly, any other nodes in the same workflow or a different workflow may use different custom roles to perform different tasks. In this manner, each node may be authorized to use or access only the computing resources that it needs in order to perform the actions with which it has been configured. In order to preserve client expectations regarding the behavior of nodes and their roles, custom roles created in this manner may be unchanged by the creation of additional custom roles or default roles at a later time.

In one embodiment, custom roles may be modified by clients. For example, after a custom role is generated and assigned to a newly provisioned node, a client may modify the custom role, e.g., by adding or deleting permissions. The modified custom role, rather than the original custom role, may then be associated with the node. Any suitable interface may be used to receive user input to create the modified custom role. For example, permissions may be added to the role or deleted from the role using suitable elements of a graphical user interface (GUI), a command-line interface (CLI), or an application programming interface (API). In one embodiment, modified custom roles may be stored (e.g., by the role management service 120) for later re-use by the same client.

As discussed above with respect to FIG. 4A, the actions of a node may be modified to add individual actions and/or delete individual actions. In one embodiment, if the modified actions are associated with a node that has a modified custom role, then the workflow system 105 may continue to use the modified custom role for the node or may instead generate a new custom role based on the modified actions. However, the user modifications may be eliminated if a new custom role is generated. Accordingly, the workflow system 105 may seek user input to determine whether to maintain the modified custom role or generate a new custom role that may eliminate the user modifications.

Configurable Workflows in a Data Pipeline

In various embodiments, a data pipeline may provide one or more services allowing users to schedule and manage data-driven workflows. In some embodiments, the data pipeline may provide clients with access to functionality for creating, configuring, and executing defined workflows that manipulate source data in defined manners, such as under the control of a configurable workflow service that is available to multiple remote clients. In at least some embodiments, a remote client may interact with a configurable workflow service over one or more public networks in order to create and configure a defined workflow that is provided by the configurable workflow service for use by the client. Such a defined workflow may, for example, include multiple interconnected workflow components that are each configured to perform one or more specified types of data manipulation operations on a specified type of input data. After a client has configured such a defined workflow, the configurable workflow service may further execute the defined workflow at one or more times and in one or more manners, such as in some situations by provisioning multiple computing nodes provided by the configurable workflow service to each implement at least one of the workflow components for the defined workflow, and by retrieving defined types of source data and providing it to workflow components in defined manners. Thus, in at least some embodiments, some or all of the described techniques are automatically performed by embodiments of a configurable workflow service, such as may be implemented by one or more software modules executing on one or more configured computing systems, as described in greater detail below.

As noted above, a defined workflow may include multiple workflow components, which may be of multiple types in at least some embodiments, including one or more data source workflow components that correspond to input data for the defined workflow, one or more data manipulation workflow components that correspond to defined data transformations or other manipulations to be performed on data, and one or more data destination workflow components that correspond to providing output data from the defined workflow. In addition, interconnections may be defined between workflow components that correspond to data flows between workflow components, such that data output from a first component may be supplied as input to a second component, with that relationship being represented as a connection from the first component to the second component. In at least some embodiments and situations, the configurable workflow service may provide a group of predefined workflow components that a client may select and use in a defined workflow of the client, optionally after being configured in one or more manners. Furthermore, in at least some embodiments and situations, the configurable workflow service may enable a client to supply or otherwise define some or all workflow components to be used in a defined workflow of the client.

Each data source workflow component that is defined for a workflow may correspond to data obtained from an indicated data source, and each component may include information such as a storage location for the data and optionally additional access information related to the storage location (e.g., login information associated with the client, a particular search or other information to use to identify data to be used, such as metadata and/or data contents, etc.). In some embodiments, the configurable workflow service may provide internal storage locations for use by clients in storing their source data, with a particular data source corresponding to such an internal storage location, while in other embodiments and situations, a particular data source may be external to the configurable workflow service, such as one or more network-accessible storage systems that are provided by or otherwise controlled by the client, one or more online storage services, one or more online data generation services, etc. A non-exclusive list of examples of online storage services that may be used include the following: Amazon Simple Storage Service (S3) that stores object data of various types, Amazon Relational Database Service (RDS) that provides relational database functionality, Amazon SimpleDB that provides database functionality to store key-value pairs, Amazon DynamoDB service that provides NoSQL database functionality, Amazon Elastic Block Store (EBS) that provides access to raw block storage devices (e.g., mounting a virtual local block storage device on a target computer system), etc. A non-exclusive list of examples of online data generation services includes an RSS feed, the Amazon Cloudwatch Service that provides monitoring functionality for executing applications and services and generates corresponding information, etc. Data sources may thus be of various forms, such as a relational or other database (e.g., the HBase open-source distributed database, the BigTable distributed database, the MongoDB database system, the Apache Cassandra distributed database management system, etc.), a hash table, a file system, an object store, etc., optionally implemented in a distributed manner. A non-exclusive list of examples of data groups that may be obtained from a data source includes a file (e.g., a web server log), a database row or other record, a stored data object, a streamed group of data, etc.

Thus, in some situations and embodiments, a particular defined workflow may obtain and use data from multiple data sources, with some or all of the data sources optionally being external to the configurable workflow service. In addition, the configurable workflow service may optionally predefine one or more types of data source workflow components, such as to correspond to a particular internal storage mechanism of the configurable workflow service, to correspond to one or more particular online storage services (e.g., online storage services that are integrated with or otherwise affiliated with the configurable workflow service, or that instead are unaffiliated with the configurable workflow service), etc. Similarly, a client may optionally define one or more data source workflow components, such as to correspond to a client-specific storage location, to an online storage service without a predefined data source workflow component, etc.

Each data manipulation workflow component that is defined for a workflow may correspond to one or more defined data transformations or other manipulations on data that is input to the data manipulation workflow component. In addition, the output from a data manipulation workflow component may be provided to a data destination workflow component (and thus to be provided to a client), or instead may be intermediate data that is provided to a next data manipulation workflow component, such as via one or more electronic messages, by storing the intermediate data in a storage location accessible to the next data manipulation workflow component (e.g., using one or more storage locations provided by the configurable workflow service). Defined data manipulations may be of various forms, including a defined type of calculation on one or more groups of input data, aggregation of multiple groups of input data in one or more manners, selection of a subset of one or more groups of input data, moving data from one storage location to another, etc. A non-exclusive list of example data manipulations includes performing a distributed data copy, performing one or more SQL (Structured Query Language) transforms, performing one or more map and/or reduce functions within a map-reduce architecture (e.g., for use within the Amazon Elastic MapReduce service), using a scientific or mathematics package (e.g., MatLab, Mathematica, etc.), executing a client-supplied script or other program, etc. Thus, in some situations and embodiments, a particular defined workflow may perform multiple data manipulation operations via multiple defined data manipulation workflow components, using predefined and/or client-defined data manipulation workflow components.

Each data destination workflow component that is defined for a workflow may correspond to output data provided from the defined workflow to one or more storage locations and in one or more manners. The types of storage locations used by data destination workflow components (and corresponding information stored for such data destination workflow components) may be similar to or the same as for data source workflow components in at least some embodiments, including storage locations that are internal to and/or external from the configurable workflow service. In addition, in at least some embodiments and situations, particular data destination workflow components may include operations to prepare and/or provide output data in a particular manner, such as by generating particular types of reports, by sending output data via one or more types of defined electronic communications, etc. Thus, in some situations and embodiments, a particular defined workflow may provide multiple types of output data in multiple manners via multiple defined data destination workflow components, using predefined and/or client-defined data destination workflow components.

In addition, a client may define a workflow in various manners in various embodiments. For example, an embodiment of a configurable workflow service may provide one or more interfaces for use by a client, such as a defined GUI ("graphical user interface"), a defined API ("application programming interface"), and/or a defined CLI ("command line interface"). When using a provided GUI, a user representative of a client may, for example, use a visual editor to specify particular workflow components for a workflow being defined, and may further specify interconnections between particular workflow components corresponding to data flows. In at least some such embodiments, the configurable workflow service may represent the defined workflow as a graph that logically represents the workflow, with various graph nodes corresponding to particular workflow components.

The configurable workflow service may further implement a defined workflow for a client in various manners and at various times. In some embodiments, each time that a defined workflow is to be used, the configurable workflow service instantiates a physical copy of the logical graph representing the defined workflow, such as by using multiple computing nodes that each implement at least one workflow component for the defined workflow. In particular, in at least some embodiments, some or all of the computing nodes are provisioned by the configurable workflow service to implement particular workflow components (e.g., to load corresponding software and/or data on those computing nodes), such as to each execute a workload worker process corresponding to each such implemented workflow component. The computing nodes may have various forms in at least some embodiments, including a separate physical computer system, a separate virtual machine (e.g., one of multiple virtual machines hosted on a physical computer system), a group of multiple physical computer systems that are operating in a distributed manner, etc. Some or all such computing nodes used for a defined workflow may in some embodiments be selected from a plurality of computing nodes provided by the configurable workflow service for use by clients. In addition, some or all such computing nodes may be provided by or otherwise controlled by the client and/or may be provided by one or more online execution services, whether instead of or in addition to computing nodes provided by the configurable workflow service. A non-exclusive list of example online execution services that may be used include the Amazon Elastic Compute Cloud ("EC2") program execution service, the Amazon Elastic MapReduce service for performing distributed map-reduce operations (e.g., by using a cluster of computing systems from the service to represent or implement a computing node for the configurable workflow service), etc. In addition, when a particular defined workflow is to be implemented multiple times, the configurable workflow service may in some embodiments maintain the provisioning and availability of some or all computing nodes for the defined workflow between two or more such times (e.g., in accordance with instructions from the client, based on an automated determination by the configurable workflow service, etc.). In other embodiments, the configurable workflow service may release some or all such computing nodes to be available after an implementation and provide the same types of provisioning of computing nodes (optionally different computing nodes) for a next implementation.

A defined workflow may further have additional types of associated information in at least some embodiments. For example, a client may specify information that indicates when to implement a defined workflow, e.g., based on a client instruction for immediate implementation, by scheduling future implementation at one or more defined future times, by scheduling one or more future implementations when one or more defined criteria are satisfied (e.g., based at least in part on availability of particular source data), etc. Defined criteria may be specified in various manners, such as criteria associated with particular workflow components or instead with the defined workflow as a whole. For example, a particular workflow component may have defined pre-condition criteria to be evaluated to determine when to execute the workflow component. Additionally, a particular workflow component may have defined post-condition criteria to be evaluated to determine when to complete execution and/or where to provide the output data (e.g., to a next workflow component, to an intermediate storage location, etc.). In some embodiments and situations, a defined workflow may further have one or more associated alarms that may be used to provide notification to a client (or to perform other activities) when one or more specified criteria are satisfied or are not satisfied (e.g., if a defined workflow is not implemented at a particular time, such as if particular source data is not available).

The configurable workflow service may further be a fee-based service in at least some embodiments, such that clients of the configurable workflow service are customers that pay fees to the provider of the configurable workflow service for at least some of the functionality provided by the configurable workflow service. In addition, when one or more online storage services and/or online execution services are used by the configurable workflow service as part of implementing a particular defined workflow for a particular client, the provider(s) of such other services may also optionally charge fees for such use, whether via the configurable workflow service or directly to the client.

Thus, use of the configurable workflow service in the data pipeline may provide various benefits in various embodiments, including enabling a client to schedule gathering data from multiple sources at particular times or otherwise when particular criteria are satisfied, performing defined types of data manipulation operations on the source data, and providing output data produced by the defined workflow in various manners. Additional benefits are discussed elsewhere herein, and will otherwise be appreciated by those skilled in the art.

In one embodiment, configurable workflow service ("CWS") workflows (also referred to as "pipelines") are defined via a configuration language that enables description of nodes (also referred to as "objects") that form a pipeline. In one embodiment, a pipeline may include objects from any of the following categories: Data Sources, Activities, Pre-Conditions and Post-Conditions, Schedules, and Alarms. In one embodiment, a Data Source is an input to or an output from a data manipulation workflow component (also referred to as an "activity" in this example embodiment).

In one embodiment, an Activity is an operation to be performed, such as data processing transformations, data copies, etc. Activities can be set to alarm on certain states and to retry multiple times on failure. In one embodiment, predefined activities may include Copy, SQLTransform, HiveQLTransform, ElasticMapReduceTransform, CommandLineTransform, and other suitable activities.

In one embodiment, a Pre-Condition or a Post-Condition is an action associated with a Data Source that evaluates to true when the Data Source is considered available and/or well formed. Pre-conditions that complete successfully enable a following Activity that consumes a Data Source as an input to be run. Post-conditions that complete successfully may enable an Activity that creates a Data Source to be considered successfully completed.

In one embodiment, a Schedule is an attribute of a Data Source that describes the periodicity of the data or an attribute of an Activity that defines the periodicity of when it runs. The periodicity can be at a granularity of one or more minutes, one or more hours, one or more days, one or more weeks, one or more months, etc.

In one embodiment, an Alarm describes a message to be published to a notification service (e.g., Amazon's SNS, or Simple Notification Service), sent via an electronic communication (e.g., e-mail), etc. Pipelines and individual Activities may have an Alarm defined for failure and/or success.

For illustrative purposes, some embodiments are described below in which specific instances of defining and implement workflows are provided in specific ways, including with respect to specific types of data, specific types of data manipulation operations, and specific types of storage services and execution services. These examples are provided for illustrative purposes and are simplified for the sake of brevity, and the inventive techniques can be used in a wide variety of other situations, some of which are discussed below, and the techniques are not limited to use with particular types of data, storage or other devices, computing systems or computing system arrangements.

Figure 6:
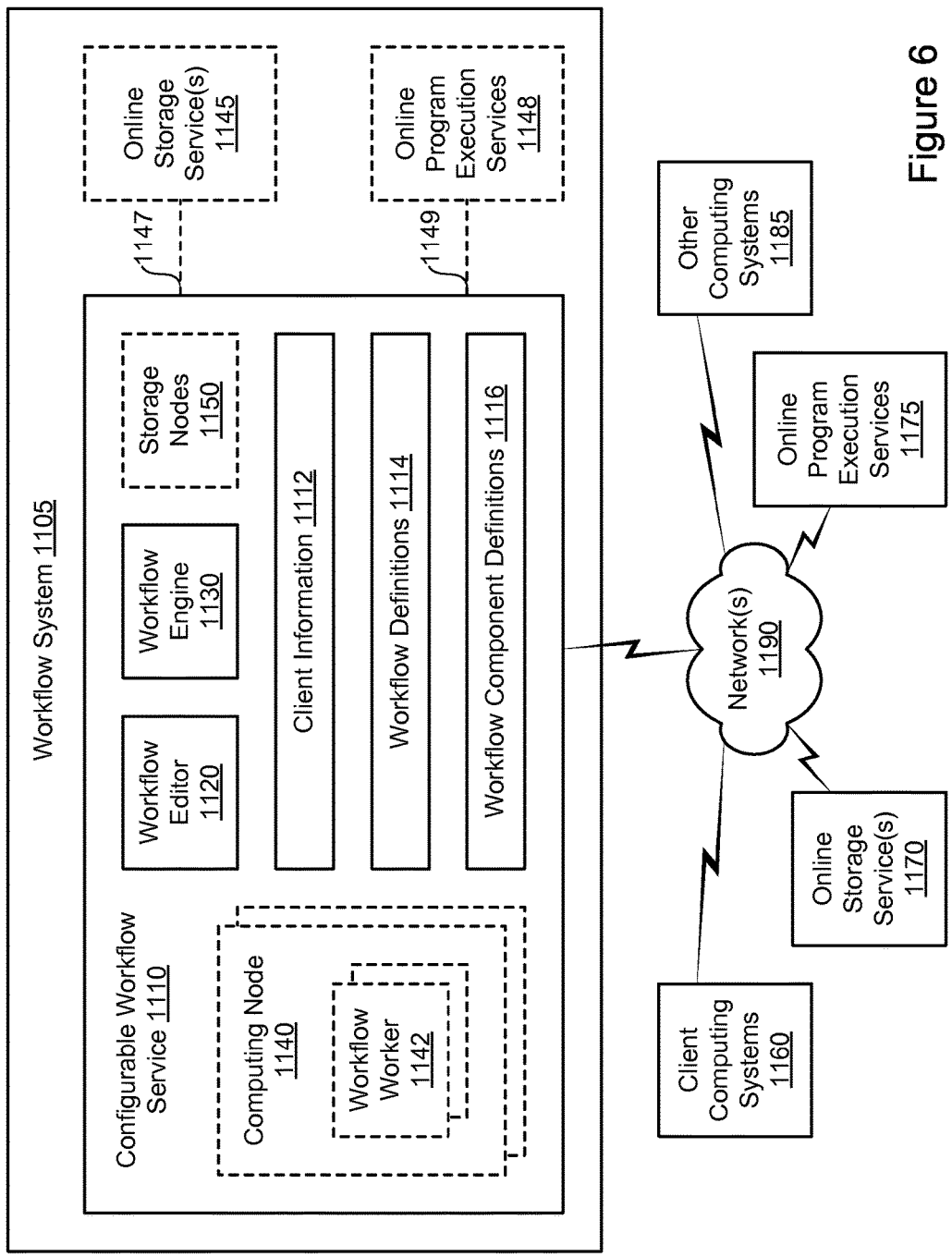
FIG. 6 illustrates an example embodiment of a configurable workflow service that provides functionality to enable remote clients to create, configure and execute defined workflows that manipulate source data in defined manners, according to one embodiment.

FIG. 6 is a network diagram that illustrates an example embodiment of a configurable workflow service 1110 that manages creation and execution of defined workflows for various clients of the configurable workflow service. As part of implementing a defined workflow, the configurable workflow service 1110 further provisions particular computing nodes to each perform specified activities corresponding to the defined workflow. In some embodiments, the configurable workflow service 1110 optionally provides a group of computing nodes 1140 on which defined workflows for clients may be executed. In other embodiments, some or all of the computing nodes used by the configurable workflow service may be provided externally to the configurable workflow service, such as by a client on whose behalf the defined workflow is implemented, by one or more online execution services, etc. In addition, in some embodiments, the configurable workflow service 1110 optionally includes one or more storage nodes 1150 on which data may be stored to facilitate the execution of defined workflows. For example, the storage nodes 1150, if present, may be used to store intermediate data results that are produced during execution of a defined workflow, and in some embodiments may further be used to store source data that is provided to a defined workflow and/or final output data produced by a defined workflow. While not illustrated in FIG. 6, the configurable workflow service may be implemented using one or more configured computing systems, as described in greater detail with respect to FIG. 7 and elsewhere.

FIG. 6 further illustrates one or more networks 1190, and various client computing systems 1160 via which clients of the configurable workflow service 1110 may interact with the service 1110 to define and execute workflows. The network(s) 1190 of FIG. 6 may include any appropriate network or combination of networks, including an intranet, the Internet, one or more private networks with access to and/or from the Internet, a cellular network, a local area network, or any other such network or combination thereof. Communications over the networks may be enabled by wired or wireless connections and combinations thereof.

In some embodiments, the configurable workflow service 1110 may provide one or both of a GUI (not shown) and/or an API (not shown), such as to enable clients to perform various interactions with the service 1110. For example, a user representative (not shown) of a particular client may locally interact with one of the client computing systems 1160 to cause further interactions to occur with the configurable workflow service 1110 over the network(s) 1190. The user may, for example, interact with a workflow editor module 1120 of the configurable workflow service, via which the user may define one or more workflows of interest for the client. As part of the interactions with the user, the configurable workflow service 1110 may store various client information 1112 regarding the client and optionally the user representative, and may store a particular definition of a newly defined workflow for the client as part of information 1114. In some embodiments, the defining of a particular workflow may include actions by the user in selecting one or more defined workflow components and specifying the interactions between those workflow components, such as by using one or more predefined system-provided workflow component definitions 1116. In other embodiments, the configurable workflow service 1110 may not provide any such system-provided predefined workflow components. As part of defining a new workflow, the user may further specify one or more source locations at which source data is to be retrieved and used for the workflow definition, and one or more destination locations to which data that is produced by the defined workflow will be provided. The various information 1112, 1114, and 1116 used by the configurable workflow service 1110 may further be stored on one or more systems that support or provide the configurable workflow service 110, such as a database of the configurable workflow service, although such systems are not illustrated with respect to FIG. 6.

In addition, the user representative of the client may optionally in some embodiments define one or more new workflow components as part of defining a new workflow, and if so, such client-defined workflow components may further have definition information stored in information 1116 in at least some embodiments. While a client-defined workflow and any client-defined workflow components may in some embodiments be treated as private unless otherwise specified by the client (e.g., to be accessible or otherwise visible only to that client unless other specified), in other embodiments and situations, at least some such client-specific information may instead be made available to other clients in specified circumstances, such as to enable other clients to use some or all of the client's defined workflow components and/or workflows (e.g., for a fee or for other benefits provided to the client who defined such information, if the client who defined such information approves use by others, etc.). In a similar manner, source data used by a client's defined workflow and final output data produced by a client's defined workflow may in at least some embodiments be treated as private to that client unless otherwise specified, although in other embodiments some or all such source data and/or final output data may instead be made available to other clients in specified circumstances (e.g., for a fee or for other benefit to the client with which that data is associated, if the client associated with such information approves use by others, etc.).

When a client indicates one or more storage locations from which source data may be obtained and/or to which final output data may be provided for a defined workflow, such storage locations may have various forms in various embodiments, as discussed in greater detail elsewhere. As one example, in at least some embodiments, the configurable workflow service may be integrated with or otherwise affiliated with one or more particular optional online storage services 1145, such as to form a single system 1105 (e.g., a single system that is operated by a single entity). If so, interactions 1147 with such optional online storage services 1145 may be performed to retrieve source data and/or to store final output data. Furthermore, in at least some embodiment, intermediate data results that are generated during execution of a workflow may similarly be stored in such online storage services 1145, such as to be produced by a first part of the defined workflow and to be later accessed and used by a second defined part of the workflow, whether in addition to or instead of one or more optional storage nodes 1150. Moreover, in at least some embodiments and situations, one or more online storage services 1170 are available over the network 1190 to the client computing system 1160 and to the configurable workflow service 1110, and may be used in a similar manner over the network(s) 1190, whether in addition to or instead of some or all of the optional online storage services 1145. In addition, in at least some embodiments and situations, a particular client may provide one or more client-specific storage systems or other storage locations using one or more other computing systems 1185, which may similarly be used over the network(s) 1190.

After a client has interacted with the configurable workflow service to define a workflow, the client may further interact with a workflow engine module 1130 of the configurable workflow service to initiate execution of the defined workflow. The execution of a particular workflow may be initiated in various manners, such as to be performed immediately upon a corresponding instruction from the client, to occur at a specified future time or when other specified criteria (such as for one or more defined preconditions) are satisfied that will initiate execution of the workflow, etc. As with the workflow editor module 1120, the workflow engine module 1130 may in some embodiments provide a GUI interface and/or and API interface for use by clients. When the execution of a defined workflow is initiated, the workflow engine module 1130 in the example embodiment retrieves workflow definition information for that defined workflow from the information 1114, and initiates the execution of the defined workflow on one or more computing nodes. In particular, the workflow definition may be constructed with various logical nodes that each correspond to defined operations and are interconnected in various manners, and the workflow engine module 1130 may select particular computing nodes to use to perform particular such operations, as well as to further perform activities to provision and initiate execution of corresponding workflow worker processes on each such selected computing node. As part of provisioning such computing nodes and/or of executing workflow worker processes on the computing nodes, additional interactions with one or more storage locations may be performed to obtain input data to be used and/or to store results data that are produced, including for intermediate results data for use by other workflow worker processes of the defined workflow.

Some or all of the computing nodes used to implement a defined workflow may, for example, be selected from optional computing nodes 1140 provided by the configurable workflow service 1110, if present, and workflow worker processes 1142 may be executed on those computing nodes to implement the defined operations. In other embodiments, the workflow engine module 1130 may use computing nodes that are not provided by the configurable workflow surface 1110, whether instead of or in addition to the optional computing nodes 1140. For example, in some embodiments and situations, a particular client may provide or otherwise control one or more other computing systems 1185, and the workflow engine 1130 may configure and use such other computing systems 1185 as computing nodes for use in executing that client's defined workflow. In addition, in some embodiments, one or more online program execution services 1148 and/or 1175 may be available for use in executing programs in various manners, and if so may be used to provide computing nodes (not shown) to execute some or all of a particular client's defined workflow. For example, the workflow engine module 1130 may provision and initiate execution of particular workflow worker processes on particular computing nodes provided by such online program execution services. As one example, in at least some embodiments, the configurable workflow service may be integrated with or otherwise affiliated with one or more particular optional online program execution services 1148 (whether in addition to or instead of one or more optional storage services 1145), such as part of a single system 1105 as described above. If so, interactions 1149 with such optional online program execution services 1148 may be performed to provision computing nodes, initiate execution of particular workflow components, receive output data produced by particular workflow components, etc.

In other embodiments, the configurable workflow service 1110 may perform additional techniques, such as to generate and provide particular types of source data for defined workflows, to perform additional activities with respect to managing final output data produced by clients' defined workflows, etc. In addition, the configurable workflow service 1110 may be implemented in some embodiments based on software instructions that execute on one or more server computing systems to program or otherwise configure the server computing system(s) to perform some or all of the described techniques, such as to program one or more hardware CPU processors (not shown) of the server computing system(s). Such software instructions may, for example, be used to implement the modules 1120 and/or 1130, or instead the functionality of the configurable workflow service may be provided using other types of modules.

In this manner, the configurable workflow service 1110 provides various benefits to various external clients, including to enable the clients to define workflows that may be executed using computing and storage resources of the configurable workflow service 1110 in part or in whole, to interact with various types of online data sources to obtain data to be manipulated, and to provide output data that is produced for storage or other use. Additional details related to particular operations of the configurable workflow service 1110 are included elsewhere herein.

Although the foregoing example embodiment of FIG. 6 is described with respect to a configurable workflow service 1110 that provides various types of functionality in conjunction with one or more client systems that each may have one or more associated users, it will be appreciated that various other embodiments may exist. For example, in at least some embodiments and situations, a client may represent an organization or other group (e.g., a company that has multiple people instead of an individual person). Thus, a client entity may have various forms in various embodiments.

In some embodiments, the configurable workflow service 1110 and optionally any online storage services and/or online program execution services that are used may each operate according to one or more fee-based structures or agreements. For example, access to some or all of the described techniques from the configurable workflow service 1110 may in some embodiments be provided in a fee-based or other paid manner to a provider or operator of the configurable workflow service 1110 and/or to at least some client systems that use described techniques of the configurable workflow service 1110. As one example, clients of the configurable workflow service 1110 may pay one-time fees, periodic (e.g., monthly) fees, and/or one or more types of usage-based fees to use functionality provided by the configurable workflow service 1110. Such fees may be based on one or more factors and activities, such as indicated in the following non-exclusive list: based on a quantity and/or type of interactions performed to define a particular workflow; a size and/or type of a defined workflow and/or of some or all of its defined workflow components; based on usage of a defined workflow, such as a measure of computing resources used in executing a defined workflow (e.g., a quantity of computing nodes used), a measure of processor capability used (e.g., CPU cycles), an amount of time that occurs during the execution of the defined workflow, activities in provisioning computing nodes for a defined workflow, amount of time during which computing nodes that are provisioned for a defined workflow are unavailable for other use, such as while those computing nodes wait for source data to be available or other preconditions to be satisfied, based on a quantity of data that is stored and/or transferred, such as based on a size of the data, an amount of time of the storage, etc.; based on content or other characteristics of particular data groups that are stored, manipulated and/or produced; etc.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more hardware computing devices comprising one or more processors and one or more memory devices, wherein the one or more hardware computing devices are configured to implement a workflow service and one or more computing resources, wherein to implement the workflow service, the one or more hardware computing devices are configured to:
        provision at least some of the one or more computing resources for a first node of a first workflow, wherein the first node is automatically assigned a current version of a default role, wherein the current version of the default role corresponds to a first version of the default role, and wherein the first version of the default role comprises first data indicative of one or more permissible actions for performing one or more tasks using the one or more computing resources;
        after provisioning the first node, generate a second version of the default role, wherein the second version of the default role comprises second data indicative of one or more permissible actions for using the one or more computing resources, wherein the one or more permissible actions of the second version differ from the one or more permissible actions of the first version, and wherein the current version of the default role corresponds to the second version of the default role in response to generating the second version of the default role;
        provision at least some of the one or more computing resources for a second node of a second workflow, wherein the second node is automatically assigned the current version of the default role;
        after generating the second version of the default role, perform a first task indicated by the first node of the first workflow, wherein the first task is performed using the one or more computing resources in accordance with the first version of the default role, even though the second version of the default role is the current version, in order to preserve expected behavior when performing the first task indicated by the first node; and
        perform, using the one or more computing resources in accordance with the second version of the default role, a second task indicated by the second node.

2. The system as recited in claim 1, wherein to implement the workflow service, the one or more hardware computing devices are further configured to:
    receive user input to generate a modified role associated with the second node, wherein the modified role is based on the second version of the default role, wherein the modified role comprises third data indicative of one or more permissible actions for using the one or more computing resources, and wherein the one or more permissible actions in the modified role differ from the one or more permissible actions in the second version of the default role;
    perform, using the one or more computing resources in accordance with the modified role, the second task a second time.

3. The system as recited in claim 2, wherein to implement the workflow service, the one or more hardware computing devices are further configured to:
    after receiving the user input to generate the modified role, generate a third version of the default role; and
    after generating the third version of the default role, perform, using the one or more computing resources in accordance with the modified role, the second task a third time.

4. The system as recited in claim 1, wherein the one or more permissible actions of the first data comprise one or more actions by the workflow service on behalf of a user and/or one or more actions by the one or more computing resources on behalf of the user.

5. The system as recited in claim 1, wherein to implement the workflow service, the one or more hardware computing devices are further configured to:
    after generating the second version of the default role, provision at least some of the one or more computing resources for a new node of the first workflow, wherein the new node is associated with the first version of the default role.

6. A computer-implemented method, comprising:
    performing, by one or more hardware computing devices comprising one or more processors and one or more memory devices:
        receiving an indication of a set of one or more actions to be performed as part of a first workflow;
        adding a first task that includes the set of one or more actions to the first workflow, wherein the first task is automatically assigned a current version of a role, wherein the current version of the role corresponds to a first version of the role, and wherein the first version of the role comprises a first set of one or more permissions for using one or more computing resources to perform the first task;
        after adding the first task to the first workflow, generating a second version of the role, wherein the current version of the role corresponds to the second version of the role in response to generating the second version of the role;
        receiving a different indication of a different set of one or more actions to be performed as part of a second workflow;
        adding a second task that includes the different set of one or more actions to the second workflow, wherein the second task is automatically assigned the current version of the role, wherein the second version of the role comprises a second set of one or more permissions for using the one or more computing resources to perform the second task;
        after generating the second version of the role, performing the first task using the first set of one or more permissions in the first version of the role, even though the second version of the role is the current version, in order to preserve expected behavior when performing the first task; and
        performing the second task using the second set of one or more permissions in the second version of the role.

7. The method as recited in claim 6, further comprising:
    configuring, based on user input, the second task with a modified second version of the role, wherein the modified second version of the role comprises a third set of one or more permissions for using the one or more computing resources to perform the second task, and wherein the third set of one or more permissions in the modified second version of the role differ from the second set of one or more permissions in the second version of the role; and performing the second task a second time using the third set of one or more permissions in the modified second version of the role.

8. The method as recited in claim 7, further comprising:
after performing the second task a second time, generating a third version of the role, wherein the current version of the role corresponds to the third version of the role in response to generating the third version of the role; and after generating the third version of the role, performing the second task a third time using the third set of one or more permissions in the modified second version of the role.

9. The method as recited in claim 6, wherein the first set and second set of one or more permissions permit one or more actions by a workflow service on behalf of a user and/or one or more actions by the one or more computing resources on behalf of the user.

10. The method as recited in claim 6, further comprising:
after generating the second version of the role, adding a new task to the first workflow, wherein the new task is configured with the first version of the role.

11. The method as recited in claim 6, wherein the second task is added to the second workflow after generating the second version of the role.

12. The method as recited in claim 6, further comprising:
generating an alert for a user, wherein the alert indicates that the second version of the role has been generated; and receiving user input to modify the first task with the second version of the role or to maintain the first task with the first version of the role.

13. The method as recited in claim 6, further comprising:
generating the first version of the role in response to adding the first task to the first workflow, wherein the first set of one or more permissions in the first version of the role are required to perform the first task.

14. A non-transitory computer-readable storage medium storing program instructions that, when executed on one or more computers, cause the one or more computers to perform:
configuring a first task of a workflow with a current version of a default role, wherein the current version of the default role corresponds to a first version of the default role, wherein the first version of the default role comprises one or more permissions to be automatically applied by default for using one or more computing resources;

modifying the default role, comprising generating a second version of the default role such that the second version of the default role is the current version of the default role, wherein the second version of the default role comprises one or more different permissions to be applied by default for using the one or more computing resources; and after modifying the default role, performing the first task using the one or more permissions in the first version of the default role even though the first version of the default role is no longer the current version of the default role and the second version of the default role is the current version, in order to preserve expected behavior when performing the first task.

15. The non-transitory computer-readable storage medium as recited in claim 14, wherein the program instructions, when executed on the one or more computers, cause the one or more computers to perform:
configuring the first task with a modified first version of the default role based on user input, wherein the modified first version of the default role comprises one or more modified permissions for using the one or more computing resource, and wherein the one or more modified permissions in the modified first version of the default role differ from the one or more permissions in the first version of the default role; and performing the first task a second time using the one or more modified permissions in the modified first version of the default role.

16. The non-transitory computer-readable storage medium as recited in claim 15, wherein the program instructions, when executed on the one or more computers, cause the one or more computers to perform:
after performing the first task the second time, generating a third version of the default role; and after generating the third version of the default role, performing the first task a third time using the one or more modified permissions in the modified first version of the role.

17. The non-transitory computer-readable storage medium as recited in claim 14, wherein the program instructions, when executed on the one or more computers, cause the one or more computers to perform:
alerting a user to the generation of the second version of the default role; and receiving user input to reconfigure the first task with the second version of the default role or to maintain the first task with the first version of the default role.

18. The non-transitory computer-readable storage medium as recited in claim 14, wherein the program instructions, when executed on the one or more computers, cause the one or more computers to perform:
configuring a second task of the workflow with the second version of the default role; and performing the second task using the one or more different permissions in the second version of the default role.

19. A system, comprising:
at least one processor;
a memory coupled to the at least one processor, wherein the memory stores program instructions, wherein the program instructions, when executed by the at least one processor, cause the at least one processor to:
provision a first workflow comprising a first task, wherein the first workflow is automatically assigned a current version of a role, wherein the current version of the role corresponds to a first version of the role, wherein the first version of the role comprises a first set of one or more permissions for performing the first task using the one or more computing resources;

after provisioning the first workflow, generate a second version of the role, wherein the current version of the role corresponds to the second version of the role in response to generating the second version of the role;

provision a second workflow comprising a second task, wherein the second workflow is automatically assigned the current version of the role corresponding to the second version of the role, wherein the second version of the role comprises a second set of one or more permissions for using the one or more computing resources to perform the second task;

after generating the second version of the role, cause execution of the first task using the first set of one or more permissions from the first version of the role, even though the second version of the default role is the current version, in order to preserve expected behavior when performing the first task; and cause execution of the second task using the second set of one or more permissions from the second version of the role.

20. The system as recited in claim 19, wherein the program instructions, when executed by the at least one processor, further cause the at least one processor to:

receive user input to generate a modified role for the second workflow, wherein the modified role is based on the second version of the role, wherein the modified role comprises a third set of one or more permissions for using the one or more computing resources to perform the second task;

cause execution of the second task again using the third set of one or more permissions.

21. The system as recited in claim 19, wherein the first set of one or more permissions and the second set of one or more permissions permit one or more actions by a workflow service on behalf of a user and/or one or more actions by the one or more computing resources on behalf of the user.

22. The system as recited in claim 19, wherein the program instructions, when executed by the at least one processor, further cause the at least one processor to:

after generating the second version of the role, add a new task to the first workflow, wherein the new task is associated with the first version of the role.

* * * * *